United States Patent
Matsugu et al.

(10) Patent No.: US 6,650,778 B1
(45) Date of Patent: Nov. 18, 2003

(54) IMAGE PROCESSING METHOD AND APPARATUS, AND STORAGE MEDIUM

(75) Inventors: Masakazu Matsugu, Chiba (JP); Toshiaki Kondo, Shingapore (SG); Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/487,997

(22) Filed: Jan. 20, 2000

(30) Foreign Application Priority Data

Jan. 22, 1999 (JP) .......................................... 11-014681

(51) Int. Cl.[7] .................................................. G06K 9/62
(52) U.S. Cl. ........................ 382/209; 382/190; 382/203; 707/6
(58) Field of Search .................................. 382/103, 107, 382/115, 116, 118, 151–152, 159, 181, 190, 195, 203–204, 206, 209, 216, 217, 218, 243, 280, 291, 305, 309; 348/169, 699; 358/403; 707/1–6

(56) References Cited

U.S. PATENT DOCUMENTS

| | | | | |
|---|---|---|---|---|
| 5,111,516 A | * | 5/1992 | Nakano et al. | 382/156 |
| 5,280,530 A | * | 1/1994 | Trew et al. | 382/103 |
| 5,459,636 A | * | 10/1995 | Gee et al. | 706/20 |
| 5,731,849 A | | 3/1998 | Kondo et al. | 348/699 |
| 5,757,287 A | * | 5/1998 | Kitamura et al. | 340/937 |
| 5,828,769 A | * | 10/1998 | Burns | 382/118 |
| 5,912,980 A | * | 6/1999 | Hunke | 382/103 |
| 6,005,977 A | * | 12/1999 | Tanimizu et al. | 382/216 |
| 6,125,145 A | * | 9/2000 | Koyanagi et al. | 375/240.16 |
| 6,324,299 B1 | * | 11/2001 | Sarachik et al. | 382/151 |

OTHER PUBLICATIONS

Nashman, et al. (Real–Time Visual Processing for Autonomous Driving), IEEE, 1993, pp. 373–378.*
Cohen, et al. (Invariant Matching and Identification of Curves Using B–Splines Curve Representation), IEEE, 1995, pp. 1–10.*

* cited by examiner

Primary Examiner—Daniel G. Mariam
(74) Attorney, Agent, or Firm—Fitzpatrick, Cella, Harper & Scinto

(57) ABSTRACT

The image of a processing target is input. A feature quantity extraction device obtains a feature quantity distribution of the input image, and makes it binary. When desired template data is selected by a user, a template data generation device automatically generates a plurality of template sets different in size from each other from the selected template data. A template scan device raster-scans each template on the respective images with a predetermined sampling pitch according to the size, and obtains the first shape fit at each position. When the user instructs start of extraction execution processing, a template figure element deformation device shifts the representative point of a figure element constituting the template figure within the shift range, and generates a new curve segment interconnecting the representative points after shift. By a shape fit evaluation device evaluating the second shape fit at each portion, the representative point is shifted such that the second shape fit becomes not less than a predetermined reference value or the maximum, and finally, a boundary generation device generates a line interconnecting the representative points.

50 Claims, 13 Drawing Sheets

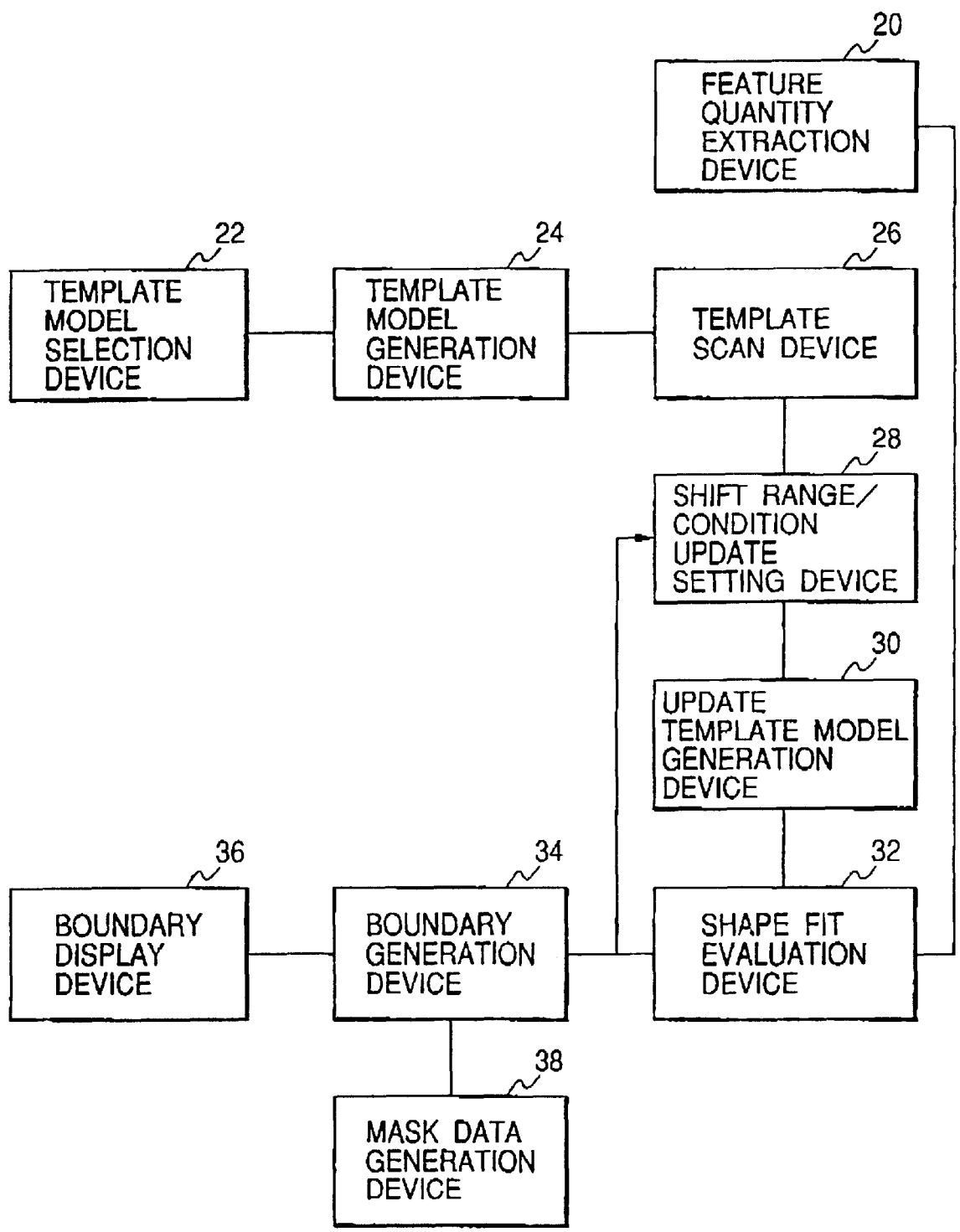

FIG. 4A

| REPRESENTATIVE POINT NO. : j |
|---|
| POSITION : $(x_j, y_j)$ |
| ORDER AND CLASSIFICATION OF CURVE SEGMENT CONNECTED TO NEXT REPRESENTATIVE POINT (j+1) : $n_j$, B SPLINE |
| GEOMETRIC CONSTRAINT CONDITION BETWEEN ADJACENT REPRESENTATIVE POINTS : $$\eta_j - \delta \leq \frac{y_{j+1}-y_j}{x_{j+1}-x_j} - \frac{y_j-y_{j-1}}{x_j-x_{j-1}} \leq \eta_j + \delta$$ |
| POSITION OF CONTROL POINT : $(x_1^q, y_1^q), (x_2^q, y_2^q), \ldots, (x_m^q, y_m^q)$ |

FIG. 4B

| REPRESENTATIVE POINT NO. : j |
|---|
| POSITION : $(x_j, y_j)$ |
| ORDER AND CLASSIFICATION OF CURVE SEGMENT CONNECTED TO NEXT REPRESENTATIVE POINT (j+1) : $n_j$, B SPLINE |
| GEOMETRIC CONSTRAINT CONDITION BETWEEN ADJACENT REPRESENTATIVE POINTS : $$\eta_j^x - \delta \leq x_j \leq \eta_j^x + \delta \quad \eta_j^y - \delta \leq y_j \leq \eta_j^y + \delta$$ |
| POSITION OF CONTROL POINT : $(x_1^q, y_1^q), (x_2^q, y_2^q), \ldots, (x_m^q, y_m^q)$ |

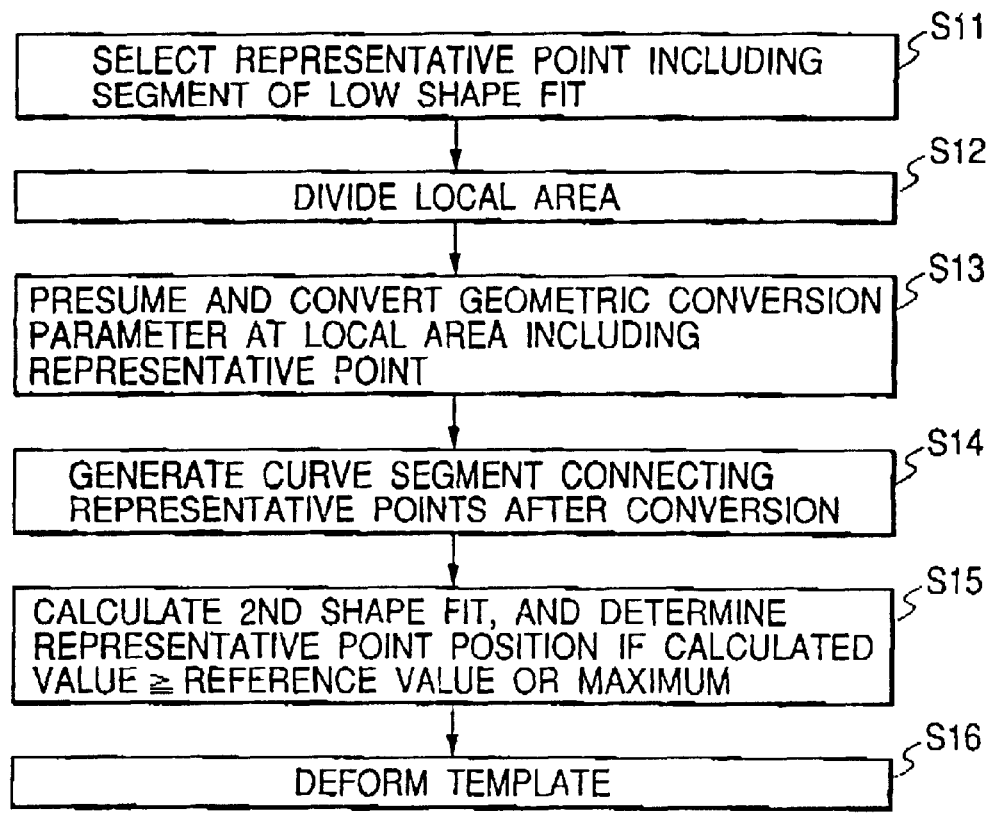
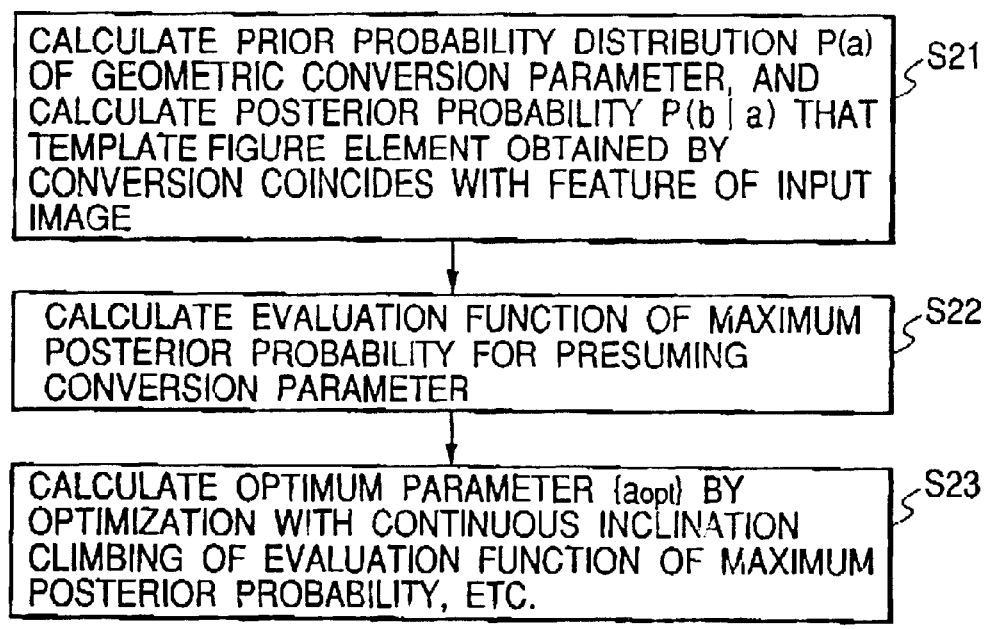

IMAGE PROCESSING METHOD AND APPARATUS, AND STORAGE MEDIUM

BACKGROUND OF THE INVENTION

1. Field of the Invention

The present invention relates to image processing method and apparatus, and a storage medium.

2. Related Background Art

Hitherto, as processing of cutting out a specific object or target from an image, various types of methods have been known. As the first type, there are a method in which removal of background or designation of area for the object to be extracted is repeated with selecting an area having color component values (or shade values) within a predetermined range including the pixel values of points on the object and target designated by a user or the background, and a method in which a general rough contour line area or local area including the contour line of the extraction target, is designated, and a boundary contour line of the target is obtained in the designated area by processing such as thinning of line or clustering, and cut out.

As the second type, there is a method in which a closed curved line (or the boundary line of a polygon) is set to enclose roughly the image portion of the extraction target, and a cut-out mask image almost close to the shape of the target is generated using information on color component only.

As the third type, there is a method in which, in a construction for detecting a target from an image and extracting its contour, the contour is extracted using a dynamic contour method in which the position and the size of the target is obtained with referring to image dictionary data in which an input shade image is mosaicked by searching density using multiple resolution, and an initial contour is set based on them.

Other than these, as technique usable for judgement of presence of a specific body in an image, or retrieving an image in which a specific body is present, from a data base to extract, there are a method in which a template prepared in advance is scanned on an image, the matching degree at each position is calculated, and a position whose matching degree is not less than a predetermined threshold value, is searched, a method in which areas of components and the component names in images are input when an image date base is prepared, and images having a predetermined feature are retrieved rapidly, a method in which the similarity to an example (sketch, image, and the like) given by a user, is obtained, and images whose similarities are high are retrieved, a method in which a boundary line is detected using a shape model, and so on.

As one technique for modeling a curved line parametrically, there are a method in which a spline curve is used, a technique (literature 2) in which Fourier descriptor is used, a method in which wavelet descriptor is used, and so on.

However, since the image extraction method according to the above first type has need of operation by relatively detailed instructions of a user, processing of retrieving and extracting (cutting out) a target having a specific shape from an image can not be automated.

In the second type represented by the method in which a closed curved line or the like roughly enclosing the image portion of an extraction target, is designated, since the area rate of the areas having the same color component contained in the closed curved line is used, if there is an area of the same color as that of the object in the background in the closed curved line, or if the closed curved line area has twice or more area in comparison with the target area, there is the problem that erroneous extraction such as extraction of a background portion is apt to occur, and it lacks adaptability.

In the contour detection apparatus of the third method, since the so-called dynamic contour method is used, in case that the background portion (portion other than the extraction target) of an input image has a complex texture pattern, or the like, due to being affected by it, there are many cases that it is difficult to reflect the complexity of the contour line to be extracted. That is, there was the problem that an unnatural irregular shape departing from the original contour line shape was extracted.

In a contour extraction method on the assumption of a probability model assuming that the parameters of a contour model and the errors of the contour model are in Gaussian distribution, in case that their distributions are non-Gaussian in practice, it is difficult to extract the right contour efficiently, and the tolerance in relation to difference in shape between the contour model and the extraction target, is low.

SUMMARY OF THE INVENTION

It is an object of the present invention to provide image processing method and apparatus, and a storage medium, in which such problems are solved.

Taking into account the above-described object, a preferred embodiment of the present invention is characterized by comprising an image input step (means) of inputting an image, a feature quantity extraction step (means) of extracting a feature quantity distribution of the input image by said image input step (means), a template model input step (means) of inputting a template model including a plurality of representative points and curved lines or segments interconnecting said representative points as a figure element, a matching step (means) of performing matching processing between said template model and said feature quantity distribution, a shift condition set step (means) of setting a shift condition of said each representative point on the basis of a matching result of said matching step (means), a representative point update step (means) of shifting said each representative point in accordance with said shift condition, a template update step (means) of generating an update template including the representative points after shift and curved lines or segments interconnecting said representative points as a figure element, and an image extraction step (means) of extracting image data in an area within said update template from said input image.

Besides, taking into account the above-described object, a preferred embodiment of the present invention is characterized by comprising a step (means) of inputting an image, a feature quantity extraction step (means) of extracting a feature quantity distribution of the input image by said image input step (means), a template model input step (means) of inputting a template model including a plurality of representative points and curved lines or segments interconnecting said representative points as a figure element, a template set generation step (means) of generating a plurality of template sets different in size from each other, having figure elements generally similar to the figure element of said template model from said template model, a first matching step (means) of performing the first matching processing between said template sets and the feature quantity distribution of said input image, a template selection step (means) of selecting one of said template sets on the basis of a result of said first matching step (means), a second matching step (means) of performing the second matching processing to said feature quantity distribution as to each representative point of the template selected in said template selection step (means), a representative point update step (means) of shifting said representative point on the basis of a result of said second matching step (means), a template update step (means) of generating an update template including the representative points after shift and curved lines or segments interconnecting said representative points as a figure element, a mask area generation step (means) of generating a mask area including said figure element in said update template as a boundary line, and an image extraction step (means) of extracting one of the contour line of said mask area and image data corresponding to said mask area.

Besides, taking into account the above-described object, a preferred embodiment of the present invention is characterized by comprising an input step (means) of inputting an image, an input step (means) of inputting a template model, an update step (means) of updating the shape of said template model on the basis of the feature quantity of an image area to be extracted from said image, and an extraction step (means) of extracting said predetermined image area from said image on the basis of the shape of said updated template model.

The present invention relates to an image processing apparatus having a new function and an image processing method, and a storage medium.

Further functions and features of the present invention will become apparent from the following drawings and embodiments.

BRIEF DESCRIPTION OF THE DRAWINGS

FIG. 2 is a schematic construction block diagram of an image processing apparatus 16;

FIGS. 4A and 4B are tables showing an example of template data;

FIG. 10 is an operation flow chart of the modified portion of an embodiment in which the update template generation processing (S7 of FIG. 5) is changed;

FIG. 12 is a flow chart showing the presumption manner of a geometric (affine) conversion parameter;

DETAILED DESCRIPTION OF THE PREFERRED EMBODIMENTS

Hereinafter, embodiments of the present invention will be described with reference to drawings.

Figure 1:
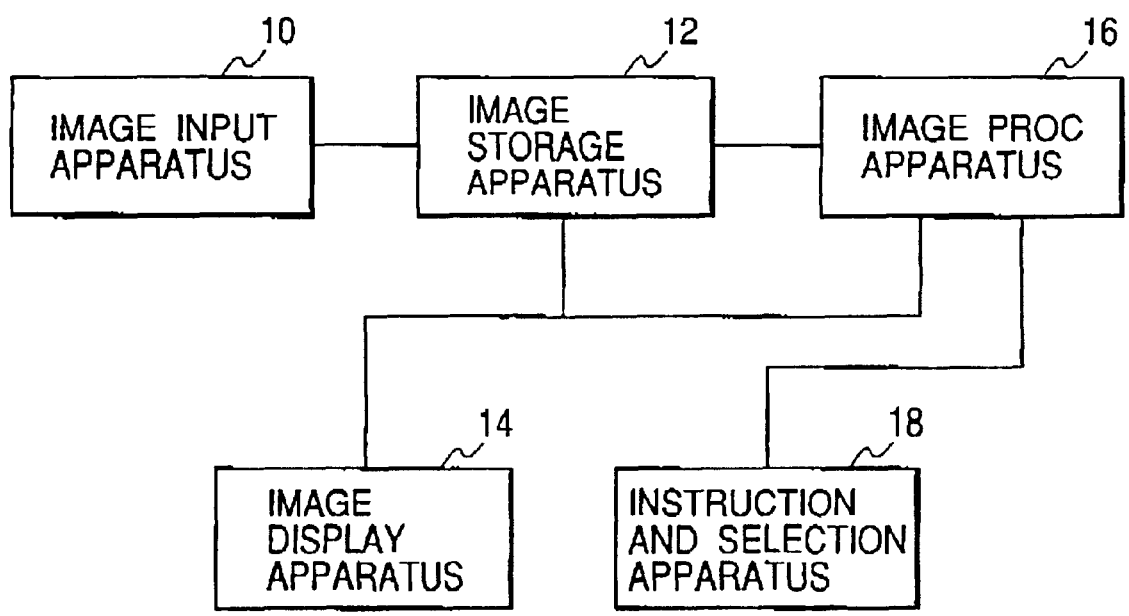
FIG. 1 is a schematic construction block diagram of an embodiment of the present invention.

FIG. 1 shows a block diagram of a schematic construction of an embodiment of the present invention. The reference numeral 10 denotes an image input apparatus, the reference numeral 12 denotes an image storage apparatus for storing image data and template model data, the reference numeral 14 denotes an image display apparatus such as CRT or liquid crystal, the reference numeral 16 denotes an image processing apparatus, and the reference numeral 18 denotes an instruction and selection apparatus comprising a pointing device such as a mouse. The image input apparatus 10 comprises an image pick-up device such as an image scanner or a digital camera, or an image data transfer apparatus connected to an image data base.

In this embodiment, image data including a target to be separated and extracted from the background, is input through the image input apparatus 10, and stored in the image storage apparatus 12. The image data stored in the image storage apparatus 12 is displayed on the screen of the image display apparatus 14 in a predetermined form.

FIG. 2 shows a schematic construction of the image processing apparatus 16. The reference numeral 20 denotes a feature quantity extraction device for extracting the feature quantity of an input image, the reference numeral 22 denotes a template model selection device for selecting a template model, the reference numeral 24 denotes a template model data generation device for generating template model data of a plurality of degrees of resolution, the reference numeral 26 denotes a template model scan device for executing scan of a template model and the first matching evaluation to the feature quantity of the input image, the reference numeral 28 denotes a shift range/condition update setting device for updating and setting the shift range/condition of each representative point on the template model, the reference numeral 30 denotes an update template model generation device, the reference numeral 32 denotes a shape fit evaluation device for making an evaluation of the shape fit after deformation by the second matching processing to the image feature quantity, the reference numeral 34 denotes a boundary generation device for generating the boundary line of a figure element with a spline interpolation curve smoothly connecting representative points of an update template model, the reference numeral 36 denotes a boundary display device for displaying the boundary line of the update template model on the screen of the image display apparatus 14 with being superimposed on the input image, and the reference numeral 38 denotes a mask data generation device for generating mask data representing the area inside the boundary line of the update template model. Although it is not shown in the drawing, further, a storage device for storing the boundary line of the update template and/or the mask date is provided.

First, a template model and a parametric curved line representation method used in this embodiment, will be described.

Template model data has, as its principal component, an abstracted figure element representing an extraction category (such as person, automobile, fish, and airplane) or a representative image (figure) pattern, and typically, contour data constituting them or the background including the contour line is given by a plain shade image or color image, or the like. It is needless to say that this contour data is not limited to one representing the external shape of the corresponding category, but may include principal shape data (e.g., eyes, a nose, a mouth, and the like, constituting a human face) constituting the category.

It is assumed that the contour line of a figure element belonging to each category, is made up by a curved line or a segment passing between representative points, and parametrically represented in advance with a spline curve, Fourier descriptor, wavelet descriptor, and the like.

For example, assuming that the whole of the contour model is made up with J spline curves, and the J-th spline curve:

$$r_j(t)=[x_j(y), y_j(t)]$$

is $m_j$-order B spline having $(n_j+1)$ control points, $$r_j(t) = \sum_{N=0}^{n_j} C_N Q_{N,m_j+1}(t) \quad (1)$$

where $j=0, 1, \ldots, J$. Besides, $Q_{N,m+1}(t)$ is represented as:

$$Q_{N,m+1}(t) = \sum_{k=0}^{m} a_{Nk} t^{m-k} \quad (2)$$

$C_N=[C_{x,N}, C_{y,N}]$ is the vector indicating the N-th control point position.

In case of using Fourier descriptor, it is represented by:

$$\begin{bmatrix} x(t) \\ y(t) \end{bmatrix} = \begin{bmatrix} a_0 \\ c_0 \end{bmatrix} + \sum_{k=1}^{\infty} \begin{bmatrix} a_k & b_k \\ c_k & d_k \end{bmatrix} \begin{bmatrix} \cos kt \\ \sin kt \end{bmatrix} \text{ where} \quad (3)$$

$$a_0 = \frac{1}{2\pi} \int_0^{2\pi} x(t)\,dt, \quad c_0 = \frac{1}{2\pi} \int_0^{2\pi} y(t)\,dt, \quad (4)$$

$$a_k = \frac{1}{\pi} \int_0^{2\pi} x(t) \cos kt\,dt, \quad b_k = \frac{1}{\pi} \int_0^{2\pi} x(t) \sin kt\,dt,$$

$$c_k = \frac{1}{\pi} \int_0^{2\pi} y(t) \cos kt\,dt, \quad d_k = \frac{1}{\pi} \int_0^{2\pi} y(t) \sin kt\,dt,$$

The symbol t is represented using the arc length s and the whole periphery length S as $t=2\pi s/S$. In case of representing part of a curved line using Fourier descriptor, it should be $$x(t)=x(2\pi-t)$$

$$y(t)=y(2\pi-t)$$

at its both end points, and accordingly, it should be $b_k=d_k=0$.

In case of using wavelet descriptor, $$\begin{bmatrix} x(t) \\ y(t) \end{bmatrix} = \begin{bmatrix} x_a^M \\ y_a^M \end{bmatrix} + \sum_{m=M-m_o}^{M} \begin{bmatrix} x_d^m(t) \\ y_d^m(t) \end{bmatrix} \text{ where} \quad (5)$$

$$x_a^M(t) = \sum_n a_n^M \bar{\phi}_n^M(t), \quad y_a^M(t) = \sum_n c_n^M \bar{\phi}_n^M(t), \quad (6)$$

$$x_d^m(t) = \sum_n r_n^m \tilde{\varphi}_n^m(t), \quad y_d^m(t) = \sum_n d_n^m \tilde{\varphi}_n^m(t),$$

The respective wavelet functions have periodicity, and are defined as follows. That is, $$\bar{\phi}_n^m(t) = \sum_k \phi_n^m(t+k), \quad \tilde{\varphi}_n^m(t) = \sum_k \varphi_n^m(t+k), \quad (7)$$

$$\phi_n^m(t) = 2^{-m/2} \phi(2^{-m}t - n), \quad \varphi_n^m(t) = 2^{-m/2} \varphi(2^{-m}t - n)$$

$$\phi(t) = \sqrt{2} \sum_n h_n \phi(2t-n), \quad \varphi(t) = \sqrt{2} \sum_n (-1)^n h_{1-n} \phi(2t-n)$$

where each of k, m, and n is 0 or a positive integer, and congruent orthogonal cubic spline functions or the like are used as the functions $\phi$ and $\Phi$.

As the contour line constituting the template model, not the contour line representing the shape of the extraction target is represented as one closed curved line, but a construction comprising a partial contour line of a shape representing the category of the extraction target, may be used.

Figure 3A:
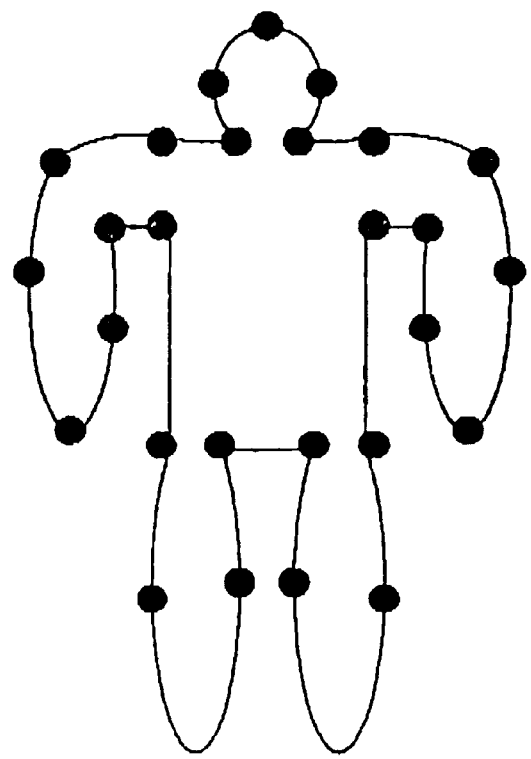
FIGS. 3A and 3B are typical views showing an example of template data and the shift range.

The density distribution of representative points and parameters of these curves (e.g., the order of B spline function, the number of control points, and the like) represent and reflect complexity, smoothness, and the like, in relation to the shape of the target to be extracted. FIG. 3A shows an example of a figure element constituting a template model. The template model data generation device 24 may generate this figure element by contour line extraction from image data, or the like.

As exemplified in FIGS. 3B, 4A, and 4B, the template model data is given shift range data of each representative point and a shape constraint condition described later, other than representative point positions and data concerning parameters of a spline curve or the like (the order and the type of the curve).

Not the shift range is specifically represented as to each representative point, but local shape conditions such as that merely the concave or convex of the shape near a representative point is kept, or that the curvature is kept, that no new loop is generated, and the like, may be given to each representative point, and they may be used as shift conditions. In this case, under two conditions that the thus defined local shape conditions are not broken, and that the fit described later, in relation to the shape of an update template model after shift does not satisfy a reference value, the shift range of a representative point is gradually expanded and searched, and the shift of the representative point is stopped at a position where the fit becomes the reference value or more.

As the shape constraint condition, for example, as described in the fourth line of FIG. 4A, $$\eta_j - \delta \leq \frac{y_{j+1} - y_j}{x_{j+1} - x_j} - \frac{y_j - y_{j-1}}{x_j - x_{j-1}} \leq \eta_j + \delta \quad (8)$$

$(x_j, y_j)$ indicates the j-th representative point position. The expression (8) indicates a rough presumption value of the range where the irregularity and the curvature in relation to the shape near the representative point $(x_j, y_j)$ should be kept. As a constraint condition in relation to size, for example, $$d_j - \mu \leq |x_{j+1} - x_j| + |y_{j+1} - y_j| \leq d_j + \mu \quad (9)$$

With this constraint condition in relation to size and the shape constraint condition, when $(x_{j-1}, y_{j-1})$ and $(x_j, y_j)$ are determined, $(x_{j+1}, y_{j+1})$ can be obtained as the mean value of ranges satisfying the expressions (8) and (9). In the expression (9), $d_j$ and $\mu$ indicate a reference value of the segment length interconnecting the points $(x_j, y_j)$ and $(x_{j+1}, y_{j+1})$, and a reference value of its permissible change width, respectively.

Figure 3B:
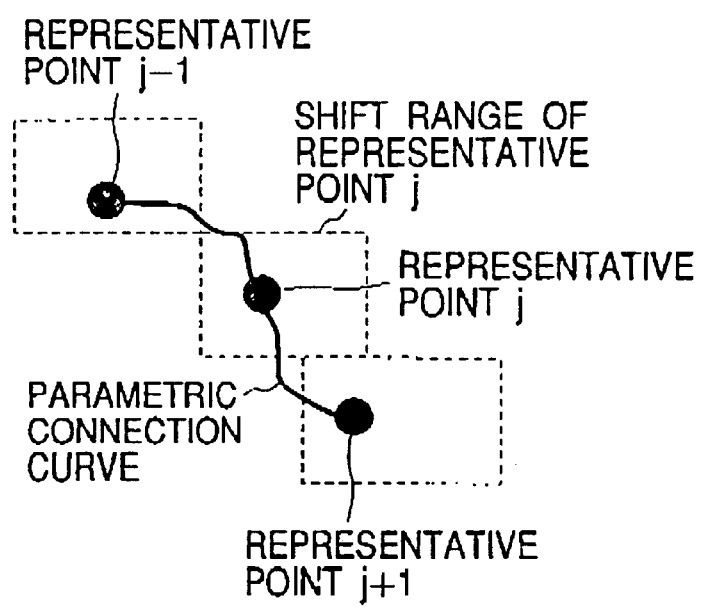

In FIGS. 3A and 3B, each of the (j−1)th, j-th, and (j+1)th representative points, parametrically represented curved lines interconnecting them, and each shift range are shown. Shift range data has been given in advance as one giving the deformation tolerance from the shape of the original template model, attendant on shift of the representative points constituting the template model. Each shift range generally varies in accordance with flexibility (such as elasticity, and the presence of joint) of each portion of the extraction target, and an apriori knowledge on shape, besides, it can properly change in the deformation update process of the template model.

For example, although a human head has a convex shape normally approximated by a secondary-degree curve (elliptic shape) function, the shift ranges of the representative points constituting this head are determined under the condition that no new concave portion is generated by the shifts. When the curve of the external shape constituting the head is represented as a function of arc length along the contour line, generation of a concave portion is detected by the second-order differential value (or an approximate value corresponding to it) becoming positive.

Accordingly, the size and the shape of the shift range of a representative point is determined such that, when the representative point adjacent to that representative point is fixed, the curved line interconnecting the representative points is in a range where the second-order differential value (or its approximate value) does not become positive near the representative point after shift. Strictly, this range relatively change with shifts of the other representative points except that representative point, but, as a range where the change quantity is not great and the similarity in shape is kept, it has been set with being fixed in advance each representative point (the size and the shape of the range may vary each representative point).

Figure 5:
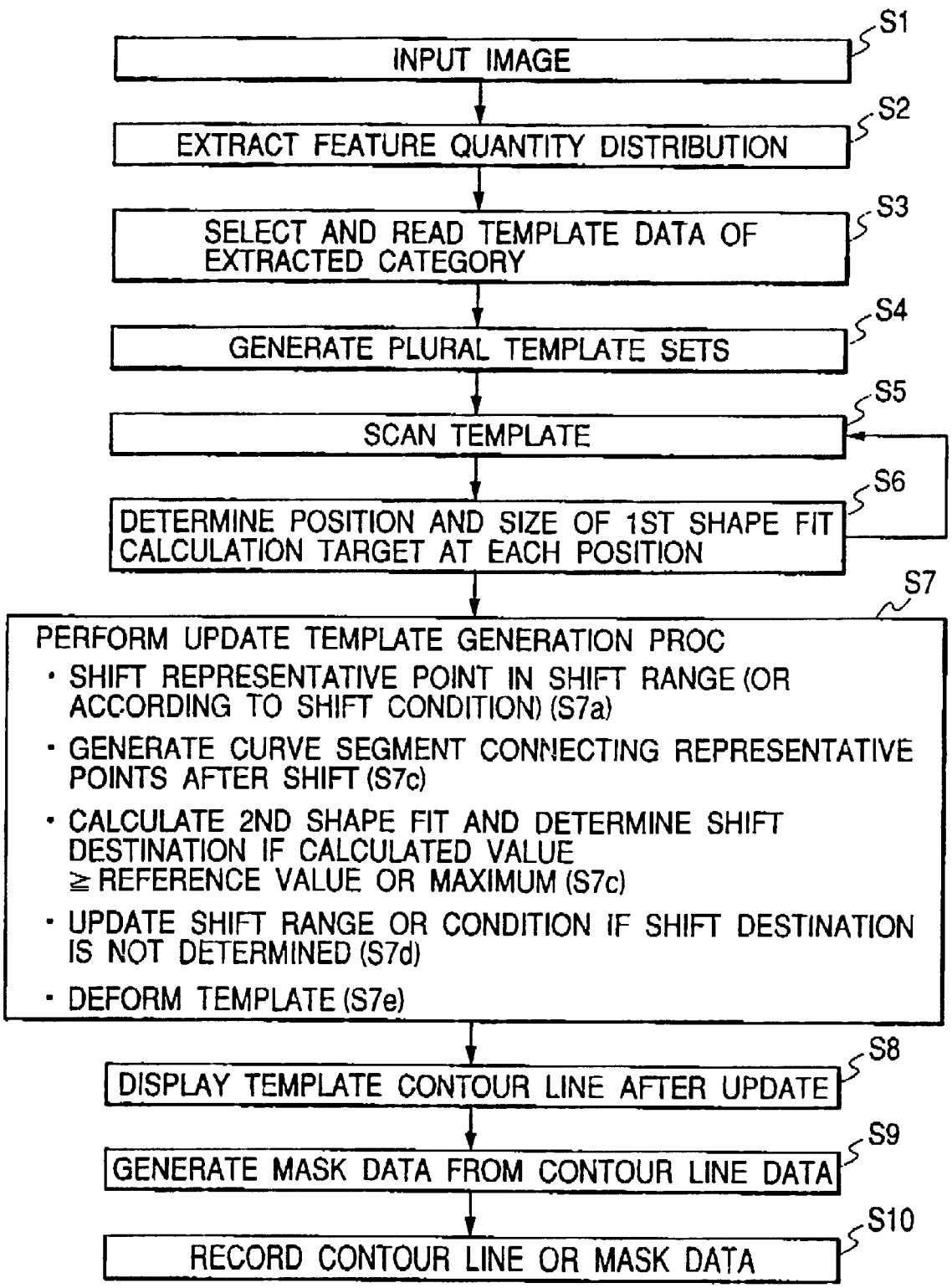
FIG. 5 is an operation flow chart of this embodiment.
Figure 6:
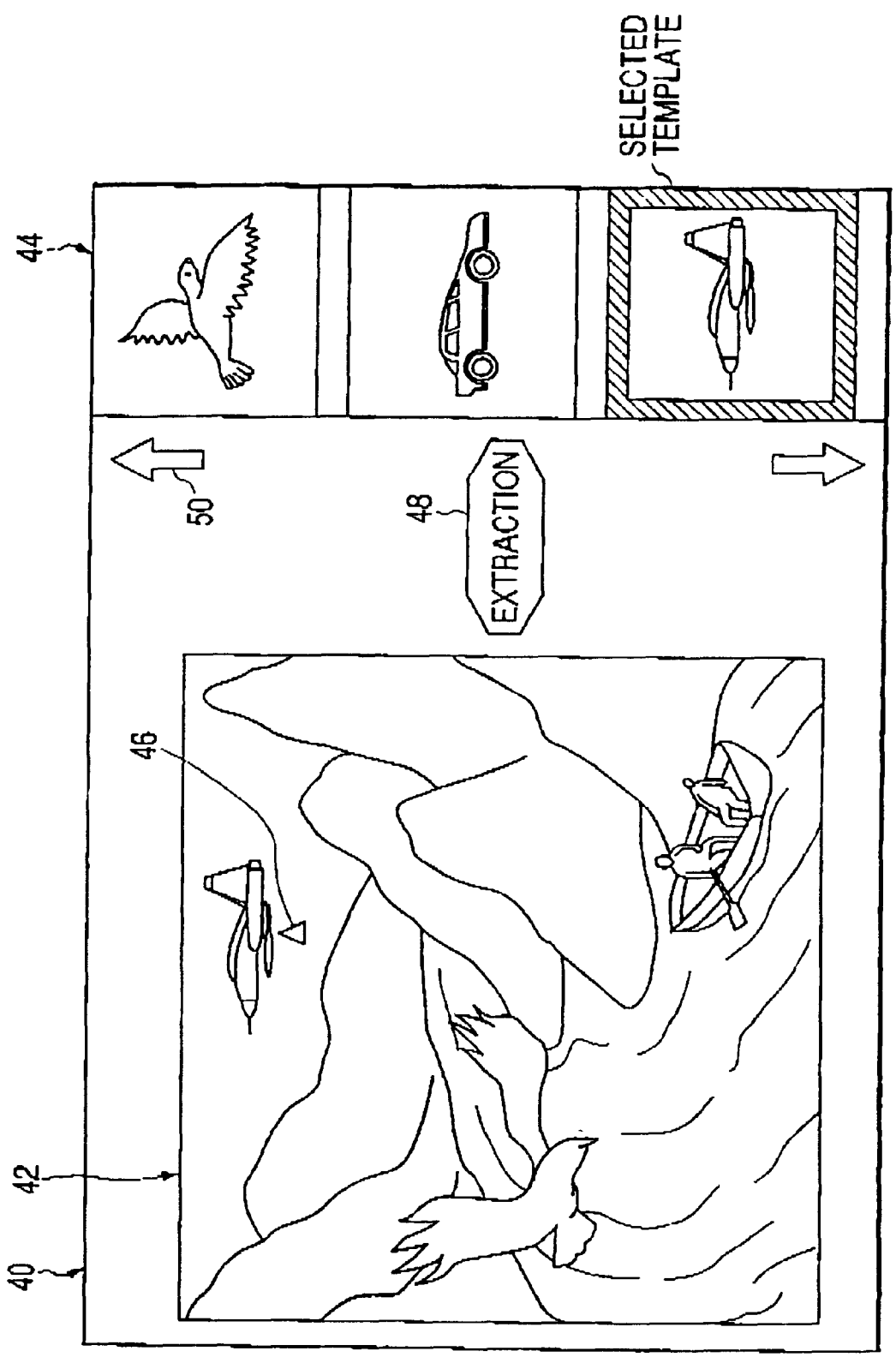
FIG. 6 is a display screen example of an image display apparatus 14.

The image extraction manner in this embodiment will be described. FIG. 5 shows the operation flow chart. Image data is input through the image input apparatus 10 such as an image pick-up device, stored in the image storage apparatus 12, and displayed on the screen of the image display apparatus 14 as exemplified in FIG. 6 (S1). In FIG. 6, the reference numeral 40 denotes the screen of the image display apparatus 14, the reference numeral 42 denotes the input image, the reference numeral 44 denotes template model data, the reference numeral 46 denotes a target position confirmation indicator, the reference numeral 48 denotes an extraction instruction button, and the reference numeral 50 denotes a template scroll button.

The feature quantity extraction device 20 obtains the feature quantity distribution of the input image (such as the edge intensity distribution or information on local spatial frequency at each point), and makes it binary with a predetermined threshold value (S2).

The template selection device 22 displays the template model data 44 on the display screen 40 of the image display apparatus 14. When a user selects the template model data of an extraction category, information on the selected template model data (e.g., the data exemplified in FIGS. 4A and 4B) is read in (S3). By scrolling the displayed contents of the template model data 44 with the scroll button 50 from the list displayed on the template model data 44 to display desired one and select it with the instruction and selection apparatus 18, desired one template model data can be selected. As for the extraction category, for example, with a voice input device such as a microphone, and a voice recognition device, the name of the extraction category may be indicated and input verbally. When desired template model data is selected by the user, the template data generation device 24 automatically generates a plurality (usually, less than ten) of template model sets different in size from each other, from the selected template model data (S4).

The template model scan device 26 raster-scans each template model on the respective images with a predetermined sampling pitch according to the size (e.g., one tenth the lateral width of the template figure, or the like) (S5), and obtains the first shape fit at each position (S6). Concretely, as the parameter representing the fit of shape, the total of the scalar products (or the absolute values thereof) of inclination vectors representing the rate of points which are on edge, and the evenness of the directions of the edge intensity inclinations (or the distances of them) at the edge points, (or the rate of points which are edge points and at which the above scalar products are not less than a reference value), is obtained on the contour line of the figure element on the template model or the fat line obtained by fattening the contour line into a predetermined width (typically, in the degree of five pixels).

Figure 7:
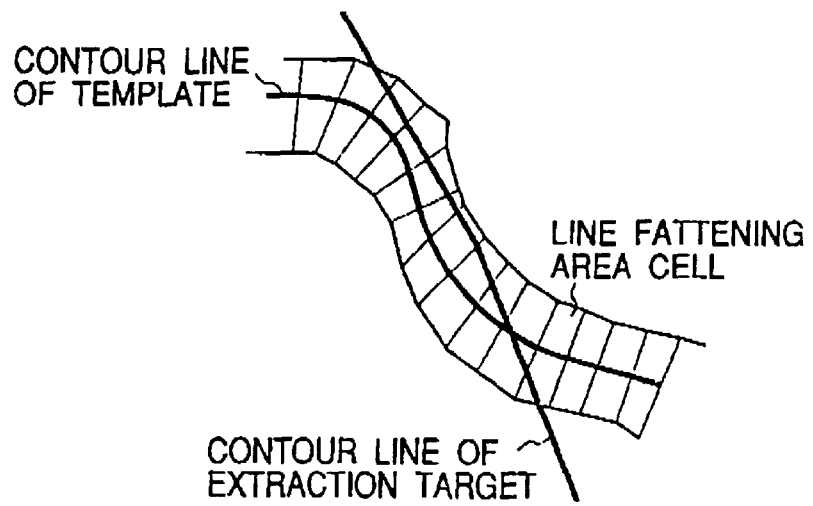
FIG. 7 is a typical view of a description example of the edge rate on a fat line.

As exemplified in FIG. 7, the edge rate on the fat line is the rate of the number of edge points to the total number of sampling points in the outline that a sampling point is counted as an edge point when edge is present at the sampling point on the center line of the fat line and in a minute area (fat line area cell) including the sampling point. The first shape fit represents the shape similarity on the whole between the extraction target in the image and the template model.

As a fit parameter, the reciprocal of an error in relation to image data (such as the brightness distribution of color components) near the contour line of the template model, or the like, may be used as a scale of the fit.

In the process of scan and fit evaluation of a plurality of templates different in size, when the fit parameter of a template model becomes not less than the predetermined reference value, scan of the template is stopped, and the aimed target confirmation indicator 46 (FIG. 6) is displayed to the user. At this step, information on the position and the size of the target was extracted. When the user presses the extraction button 48 to instruct start of extraction execution processing, the next update template generation processing (S7) is executed.

Figure 8A:
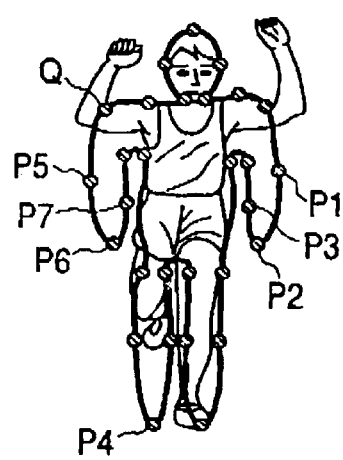
FIGS. 8A, 8B, and 8C are typical views showing states of deformation of a template figure in an update template generation processing process.
Figure 8B:
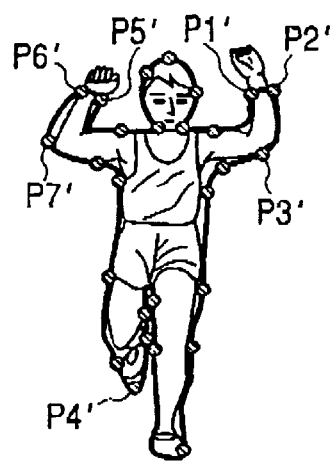
Figure 8C:
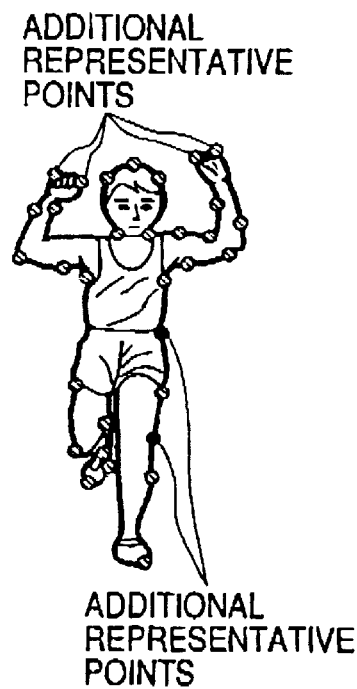

FIGS. 8A to 8C show states of deformation of a template figure element in the update template generation processing process. In FIG. 8A, the degree of matching (such as the edge rate on an interpolation curve) between the initial shape of the template figure and the target shape of an input image is displayed as representative points P1, P2, ..., P7 of small portions. The representative points other than these are the points that matching is relatively good, and the optimum destination is detected in each shift range as shown in FIG. 3B.

In the update template generation processing (S7), the template figure element deformation device 30 shifts the representative points of a figure element (curve segment) constituting the template figure within the shift range (or in accordance with shift conditions such as the expressions 8 and 9)(S7a), the template figure element deformation device 30 generates a new curve segment interconnecting the representative points after shift (S7b), the representative points are shifted such that the second shape fit becomes not less than the predetermined reference value or the maximum by the shape fit evaluation device 32 evaluating the second shape fit at each portion (S7c), and finally, the boundary generation device 34 generates curved lines (or segments) interconnecting the representative points. In the process of executing these processings, relief of the shift conditions, or the like, (S7d), is performed at need, and finally, the whole of the template is deformed so as to satisfy the shift conditions (S7e).

The boundary display device 36 displays the boundary line on the screen of the image display apparatus 14 with being superimposed on the input image. Update template model data is generated as binary mask data representing the boundary data or the area.

Shift and fit evaluation are efficient if they are not executed with shifting each representative point at the same time, but executed in the manner that shift of the representative point relaying a segment of a low edge rate adjacent to the representative point that is an end point of a segment of a high edge rate, has priority. FIG. 8B shows the shape of the update template model representing the curved line interconnecting the representative points after thus shifting. In FIG. 8B, Pi of FIG. 8A has been shifted to Pi' in FIG. 8B. For example, in FIG. 8A, as for the representative point P5 adjacent to the representative point Q that is an end point of the segment of a high edge rate, the destination of P5 is first searched on a circular arc of a predetermined radius (e.g., the arc length from Q to P5) around the point Q.

In the destination search of the representative point position, by representing the above-described shift range with a predetermined probability distribution (especially, one that the value becomes zero out of the shift range), probably generating the representative point position given by the distribution, and evaluating the shape fit of the curve segment including the representative point each time, the position where the value becomes not less than the predetermined reference value (or the maximum) may be presumed.

The destination of the representative point is determined on the basis of the evaluation result of the second shape fit. The second shape fit is defined for each representative point, and represented by the linear sum of coincidence degrees within a permissible range (the rate of points coincidental within the permissible range) between the edge rate on the curved line (or segment) interconnecting the representative points (normally, two) adjacent to the representative point and the feature quantity inclination (such as the inclination of the edge intensity distribution) on the curved line (or segment).

The shift range/condition update setting device 28 expands the shift range of that representative point in accordance with the value of this second shape fit, or relieves the shift conditions (S7d), and may search and shift the optimum representative point position from areas which have not yet been searched, that is, the representative point position where the second shape fit becomes the maximum. That is, by deforming the figure element of the above-described template model on the basis of the second shape fit, as for even the target having the contour line slightly different from the contour shape data of the template belonging to the extraction category, as a result of performing expansion of the representative point shift range as to non-fit portion or relief of the shift conditions, the whole contour extraction becomes possible.

Figure 9A:
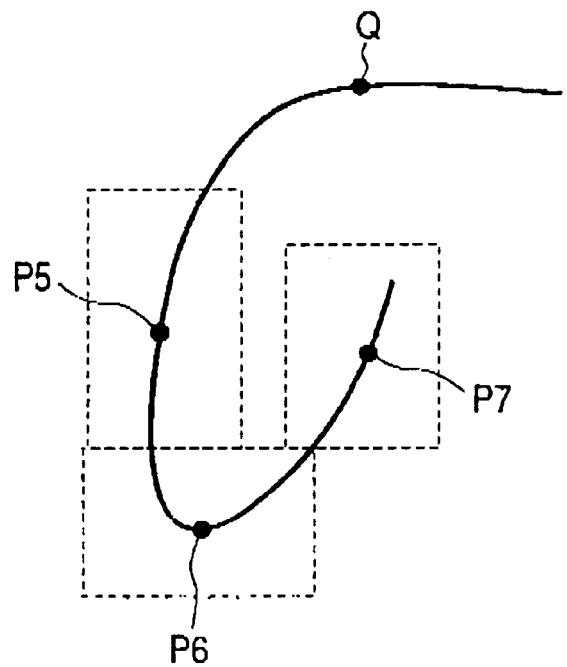
FIGS. 9A and 9B are typical views showing states of shift of representative points P6 and P7 with P5 shifting to P5'.
Figure 9B:
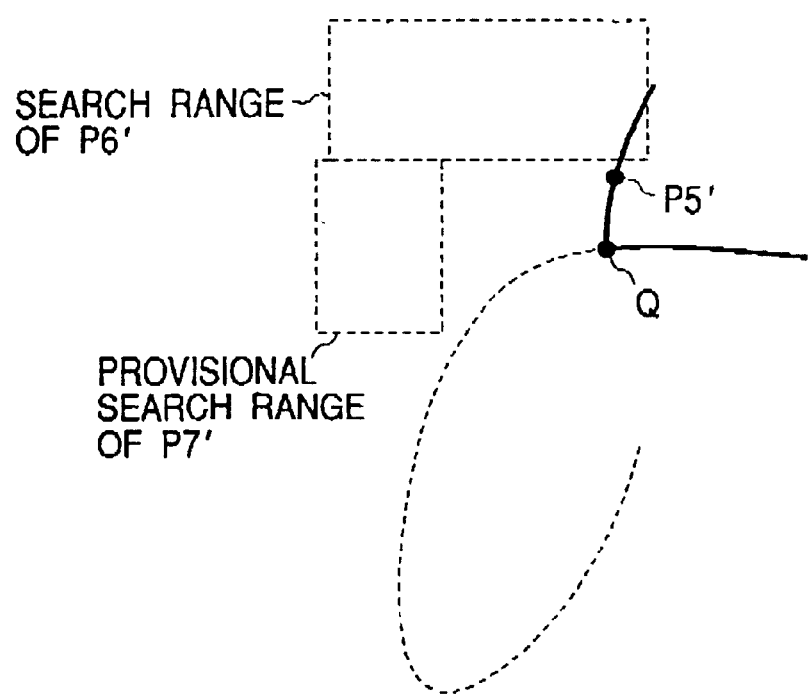
Figure 11A:
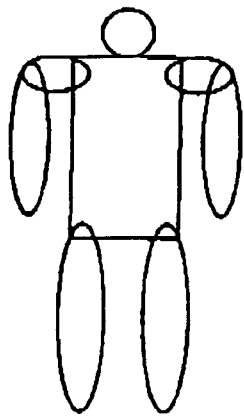
FIGS. 11A, 11B, 11C, and 11D are examples of a template model of a human body.
Figure 11B:
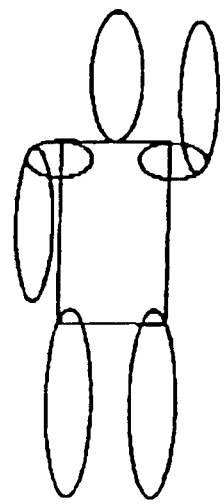
Figure 11C:
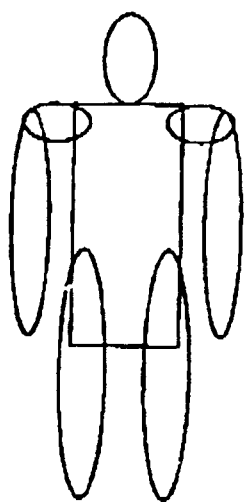
Figure 11D:
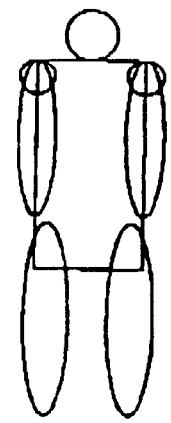

In the example shown in FIGS. 8A to 8C, with P5 shifting to P5', the shift ranges of the remaining representative points present continuously, are updated on the basis of the position of P5'. The state is shown in FIGS. 9A and 9B. Concretely, the shift range is set with the constraint condition of one of that the shape of the curved line passing P5', P6', and P7' is convex, and that the size in the same degree as the length of the curved line is kept, and search is executed. Although which condition or both conditions are used varies in accordance with the flexibility of the extraction target, the presence of joint, or the like, it is assumed that it has been defined in advance in template model data.

In FIGS. 9A and 9B, the sizes of the search ranges of P6 and P6' and P7 and P7' are in the same degrees, and the disposition of each search range is set with applying the constraint condition that the shape is convex (e.g., the condition shown in the expressions (8) and (9)). As shown in FIG. 9B, there may be a case that the newly set shift range is at a place distant so as not to overlap the original shift range at all.

In case of not specifically setting the shift range but shifting the representative point with giving only the constraint condition of shift, it should be imposed as a condition that the change rate in a tangent direction of the curved line passing P5', P6', and P7' is positive (refer to the expressions (8) and (9)), or the like.

As the curved line interconnecting the representative points after shift, it is desirable to use the same kind of curved line as the curved line constituting the original template model. But, the order of the parameter, or the like, can be changed so as most to fit the shape of the extraction target. For example, in case of using B spline curve, the order, the number of control points, or the like, may be changed.

One example of determination method of curve parameter constituting the template model after update will be described. It is assumed that a curve segment $v(s)=(x(s), y(s))^T$ is modeled using an n-th order B spline function. For example, the optimum value of the parameter after the representative point shifting, is presumed as follows. That is, $$v(s)^T = B(s) \cdot Q \qquad (10)$$

$$B(s) = \frac{1}{t^{n-1}}((t-s)^{n-1}, s(t-s)^{n-2}, \ldots, s^{n-2}(t-s), s^{n-1})$$

$$P = \begin{pmatrix} q_{x1} & q_{y1} \\ q_{x2} & q_{y2} \\ \vdots & \vdots \\ q_{x_{n-2}} & q_{y_{n-2}} \\ q_{x_{n-1}} & q_{y_{n-1}} \end{pmatrix}$$

where T represents a transposed matrix, and B(s), t, and Q represent a B spline matrix, the length of a curve segment, and a B spline parameter, respectively. Assuming that the contour line of the extraction target corresponding to the curve segment is $v'(s)=(x'(s), y'(s))^T$, the feature quantity (such as edge intensity value) at each point is represented by $E_{v'}(s)$, and $E_{v'}(s)$ takes a normal distribution to $E_v(s)$, the probability distribution density function is given by $$p(E_{v'(s)}) = \frac{1}{\sqrt{2\pi}|\Gamma|} \exp\left(-\frac{r(s)^T \Gamma^{-1} r(s)}{2}\right) \qquad (11)$$

$$r(s) = E_v(s) - E_{v'}(s)$$

$$\Gamma = \begin{pmatrix} \sigma_x^2 & 0 \\ 0 & \sigma_y^2 \end{pmatrix}$$

where $(\sigma_x)^2$ and $(\sigma_y)^2$ represent variances to $E_{v'}(s)=(E_{x'}(s), E_{y'}(s))$.

In this embodiment, for simplifying the description to make the understanding easy, it is assumed that $E_v(s)$ is binary (0 or 1), and the contour model data of the template figure is given as a set of points that $E_v(s)=1$. At this time, the maximum likelihood presumption value is given by $$Q = arg \min_Q \sum_i |E_{v'}(s_i) - E_v(s_i)|^2 \quad (12)$$

The order of Q, or the like, is obtained as n that the information quantity reference AIC(Q) shown below becomes the minimum, or the like. Concretely, $$AIC(Q) = N \log 2\pi |\Gamma| + \quad (13)$$

$$\sum_{i=1}^{N} (E_{v'}(s_i) - E_v(s_i)^T \Gamma^{-1} (E_{v'}(s_i) - E_v(s_i)^T)) + 2 \ (Number(Q))$$

Number(Q) represents the number of elements of Q. Expansion of the shift range typically expands the shape of the original shift range simply at a predetermined magnification. But, it may be non-isotropic expansion in which a tangent direction of a curved line including that representative point of the template figure element is taken greatly. At this time, it is needless to say that search is performed in the range satisfying the above-described shift conditions.

If the number of representative points that the second shape fit is less than a predetermined reference value (e.g., 0.3), is not more than a certain value (e.g., the majority) of the whole even by relief of the constraint conditions in relation to shift, deformation of that template model may be stopped, and the above-described processing may be executed with changing to another template different in size or the like.

In case that the edge rate is very high (e.g., 0.9 or more) on the curve segment of the template interconnecting the representative points present near that representative point, search of destination of that representative point as described above may not be performed.

As shown in FIG. 8C, on the curved line (or segment) interconnecting the representative points, in case that there is a non-edge point of a feature quantity extracted before, the non-edge point may be added as an additional representative point (when such non-edge points are continuous, the middle point on the continuous non-edge segment is used as a new representative point), the shift range may be similarly set as to the representative point (or shift search is performed so as to satisfy the shift conditions) to be shifted to the position satisfying the constraint conditions, and a curved line interconnecting the representative points adjacent to the representative point may be generated. Although addition of this representative point can be automatically performed, it may be executed by instructions of a user. In case that no suitable representative point position is detected, expansion of the shift range and relief of the shift conditions are executed similarly.

Finally, the template contour line after update is displayed (S8), mask data is generated from the contour data (S9), the contour line or the mask data is stored in a storage device at need (S10), and processing is ended.

The above each processing may be formed in a predetermined program form executable in a computer, or it is clear that processing in each part can be realized also in hardware such as a predetermined gate array (such as FPG and ASIC), or in a form in which a predetermined computer program and a partial hardware module realizing part of elements shown in FIG. 1, are mixed. In case of including the hardware module, it is needless to say that each component may not always be the same as the construction shown in FIG. 1, but one whose function is substantially the same, or one that one element has a plurality of functions of FIG. 1, is included in the technical scope of the present invention. This point is the same in the below embodiments.

An embodiment in which update template generation processing (S7 of FIG. 5) is changed, will be described. In this change embodiment (second embodiment), after scan of template model and the fit evaluation are performed, and the position of the extraction target and a suitable template model are selected, update template model generation processing specific to this embodiment is executed. The flow chart of the concrete processing manner is shown in FIG. 10.

First, a representative point including a segment of a low shape fit is automatically extracted from template model data before update (S11), and the template model data is divided into local areas so as to include the representative point (S12). In case of using a template model that has been area-divided each set of shape elements in advance, this area division processing is needless.

At the local area including the representative point, presumption and conversion of a geometric conversion parameter as described below, are executed (S13). In this embodiment, although the template model is updated by local geometric deformation (such as a local affine transformation, local bilinear transformation, and local perspective transformation) as to a near area to a predetermined representative point, here, the local geometric conversion parameter of the template model for that purpose is obtained as a parameter as most fits to the target in the input image on the basis of Bayesian presumption technique in probability process in relation to curve parameter.

Further, for minutely adjusting the contour model shape at need, like the above-described embodiment, a curve segment interconnecting the representative points after conversion is generated (S14), the second shape fit is evaluated (S15), and the template shape is deformed and updated (S16).

The meaning of performing the local geometric deformation and the fit evaluation in this embodiment, is to make search of the contour model fitting to the extraction target, efficient by converting the positions of a plurality of representative points in a lump in a local area so as to coincide to a given deformation mode while the relative positional relation between the representative points (i.e., geometric topology, concave or convex shape, etc.) is generally kept.

Affine transformation, perspective transformation, and bilinear transformation are given by the below expressions, respectively. That is, $$[x \ y \ 1] = [u \ v \ 1] \begin{bmatrix} a_{11} & a_{12} & 0 \\ a_{21} & a_{22} & 0 \\ a_{31} & a_{32} & 1 \end{bmatrix} \quad (14)$$

$$[x' \ y' \ w'] = [u \ v \ w] \begin{bmatrix} a_{11} & a_{12} & a_{13} \\ a_{21} & a_{22} & a_{23} \\ a_{31} & a_{32} & a_{33} \end{bmatrix} \quad (15)$$

$$[x \ y] = [uv \ u \ v \ 1] \begin{bmatrix} a_3 & b_3 \\ a_2 & b_2 \\ a_1 & b_1 \\ a_0 & b_0 \end{bmatrix} \quad (16)$$

x'=xw', y'=yw', [uv] represents coordinates before conversion, [xy] represents coordinates after conversion, and $\{a_{ij}\}$, $\{a_i\}$, $\{b_i\}$, and w represent conversion parameters.

As the near area, it may be a rectangular area of a predetermined size including a plurality of representative points, or the template model may have been divided each block in advance, and deformation may be performed each block. For example, in a template representing a human body, one block-divided each significant shape such as head, trunk, chest, and leg, is used as the near area. FIGS. 11A to 11D exemplify the resultant views FIGS. 11B, 11C, and 11D that predetermined geometric conversion was performed to each part as to the original data view FIG. 11A. It is needless to say that contour data used actually is the most outside contour line of each figure of FIGS. 11A to 11D.

By shifting each point (or representative point) position in the near area by the above geometric conversion, the template model is deformed. With an example of affine transformation, the manner of obtaining the optimum conversion parameters will be described. It is assumed that the prior probability of a conversion parameter set $\{a_{ij}\}$ is P(a), the prior probability of image data is P(b), the posterior probability that the template figure element obtained by the conversion, coincides with the feature quantity of the input image when the conversion parameter is given, is P(b|a), the posterior probability that, when the feature quantity b of the image is given, the conversion parameter set of the template corresponding to it, is ($a_{ij}$), is P(a|b), and the conversion parameter to be obtained is $\{a_{opt}\}$. $\{a_{opt}\}$ is given in accordance with Bayesian law as a parameter giving the maximum posterior probability max[P(a|b)] by the below expression. That is, $$\{a_{opt}\} = \mathrm{argmax}_a(P(a \mid b)) = \mathrm{argmax}_a\left(\frac{P(b \mid a)P(a)}{P(b)}\right) \qquad (17)$$

Obtaining a logarithm of the rightmost side of the above expression, besides, considering that P(b) is a constant, finally, $$\{a_{opt}\} = arg\ \max_a(\ln P(b \mid a) + \ln P(a)) \qquad (18)$$

Next, the presumption manner of the geometric (affine) conversion parameter will be concretely described with reference to FIG. 12. The prior probability distribution P(a) of the geometric conversion parameter and the posterior probability P(b|a) that the template figure element obtained by the conversion coincides with the feature quantity of the input image, are obtained as shown by the below expression (S21), and they are substituted in the right side of the expression 18 to obtain the maximum posterior probability evaluation function (S22). The parameter $\{a_{opt}\}$ that the value of the obtained function becomes the maximum, is obtained by an optimization method such as continuous inclination climbing method (S23).

It is assumed that the template is made up by a linear figure, and resultant errors that affine transformation {a} is performed to binary template data t(u, v) in the set N of points on the local segment (curve element) constituting the figure element of the template Including a representative point, takes a Gaussian distribution. Under this assumption, the posterior probability P(b|a) is given by the below expression. That is, $$P(b \mid a) = \prod_{(u,v)\in N}\frac{1}{\sqrt{2\pi}\,\sigma}\exp\left[-\frac{\{b(a(u,\,v)) - t(a(u,\,v))\}^2}{2\sigma^2}\right] \qquad (19)$$

where σ, a(u, v), and b represent the variance, coordinates to which the point (u, v) is shifted by the affine transformation, and a binary edge map of the input image (one that the edge intensity distribution is made binary with a predetermined threshold value), respectively. In case that the template data is a shade image, N is a set of points on the local area including that representative point or the area including that representative point divided in advance, and b represents the edge intensity distribution.

Assuming that the prior probability distribution P(a) takes a high value in the conversion mode giving variable power to a horizontal or vertical direction, rotation, or shift, $$\ln P(a) = \sum_{mode} V_{mode}\ln P_{mode}(a) \qquad (20)$$

$$\sum_{mode} V_{mode} = 1$$

$$\ln P_{mode}(a) = \sum_{i,j}\left[\ln\left(\frac{1}{\sigma_{ij,mode}\sqrt{2\pi}}\right) - \frac{(a_{ij,mode} - m_{ij,mode})^2}{2\sigma^2_{ij,mode}}\right] \qquad (21)$$

where $m_{ij}$ and $\sigma_{ij}$ represent the mean and the variance of $a_{ij}$, respectively, and $$V_{mode}\in\{0,1\} \qquad (22)$$

The mode is represented as mode={$rotation_1$, $rotation_2$, ..., $magnification_1$, $magnification_2$, ..., $shift_1$, ..., others}, and the parameter values of $m_{ij}$ and $\sigma_{ij}$ are given each mode. The mode "others" is an arbitrary conversion mode to which no specific name is given. The optimum conversion parameter is obtained by substituting the expressions 19, 20, 21, and 22 in the expression 18, and using a continuous gradient ascent method or Powell method as to $V_{mode}$ and $\{a_{ij}\}$. It is needless to say that the above is one example of technique for obtaining the optimum conversion parameter, and another optimization method (such as EM algorithm, dynamic programming, and hereditary algorithm) may be used.

Using the template model data converted with the conversion parameter obtained by the above-described method, as an initial value, shift of the representative point based on the second shape fit evaluation shown in the first embodiment and generation processing of the curved line interconnecting the representative points, may further be performed.

When the contour line (closed curved line) of the extraction target is obtained by the above-described method, the closed curved line data is displayed on the screen of the image display apparatus 14, and, if necessary, mask data is generated as area data in the closed curved line, and either of them is stored in predetermined storage means.

A variable shape template model made up by a figure element having an undefined portion in its part, may be used. The undefined portion is a portion whose degree of freedom in deformation is large, and means a portion with constraint conditions that no new loop shape is generated with deformation, and that it is known in advance whether the shape corresponding to the undefined portion is concave or convex, to which specific constraint conditions other than them are not imposed.

As the extraction target, for example, because it is known in advance that portions having joints such as a human chest portion and leg portion have their degree of freedom larger than the other portions, these portions are defined in advance on the template model data as undefined portions.

Like the first embodiment, scan of the template and the fit evaluation are executed, and the position of the extraction target and a suitable template model are selected. Next, deformation of the figure element constituting the template model and template model update by the shape fit evaluation are executed. At that time, first, the template is deformed by the method shown in the first or second embodiment in the portion except the undefined portion, and then, the contour line of the undefined portion is presumed.

Figure 13A:
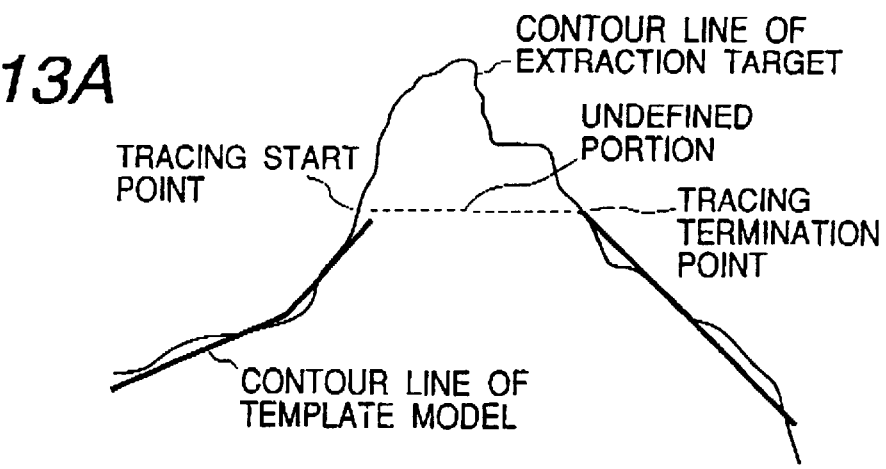
FIGS. 13A, 13B, and 13C are typical views illustrating the contour presumption manner of a template model having an undefined portion.
Figure 13B:
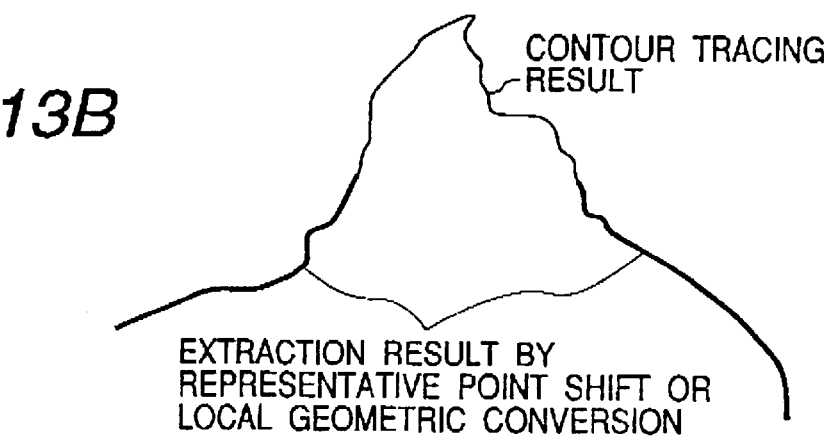

Two methods will be described as the method of presuming the contour line of the undefined portion. In the first method, contour tracing in which one end point of the undefined portion is the start point, and the other is the termination point, is executed each undefined portion. A curved line approximating the contour line of the undefined portion obtained as the result, may be generated. FIGS. 13A and 13B show one example of the contour shape extraction process of the undefined portion according to the first method.

Figure 13C:
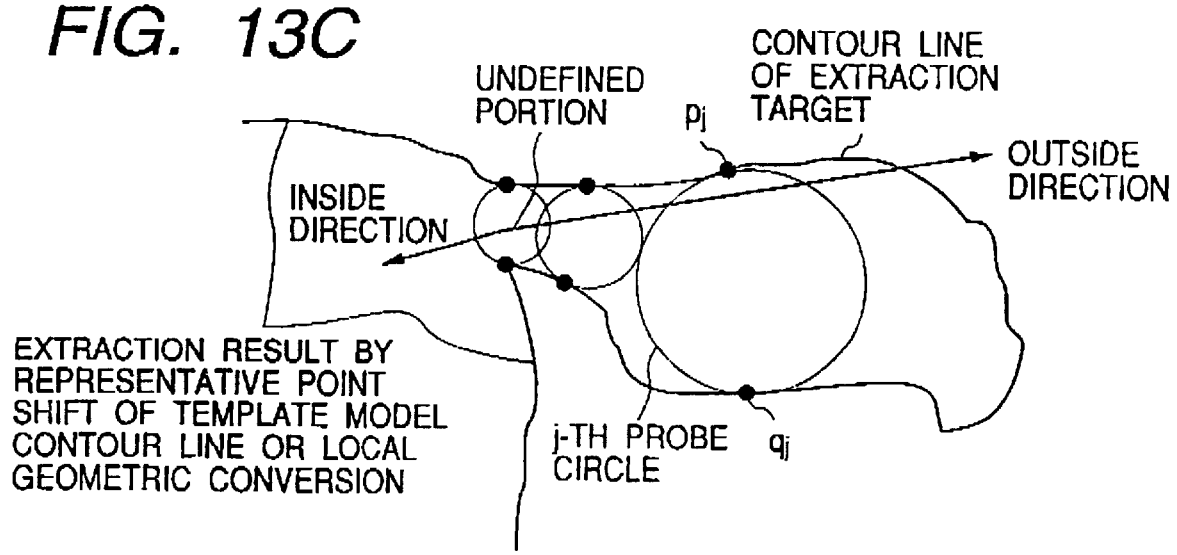

In the second method, as shown in FIG. 13C, as the probe circle that the segment interconnecting both end points of the undefined portion is its diameter, is shifted outside when the shape of the undefined portion is convex, and in the inside direction when it is concave, with changing the radius and the position of the circle each very small quantity at each place, the position and the radius of the circle that the contour of the extraction target comes into contact with the circle at two positions ($p_j$, $q_j$), are obtained. Thereby, in order, coordinates of the contour line are determined. This method is suitable for extracting the contour line of a shape having no branch. After a general shape is extracted by this method, using the extracted portion as an initial contour model, the shape of the detailed portion may be extracted by the technique described in the first or second embodiment.

Figure 14:
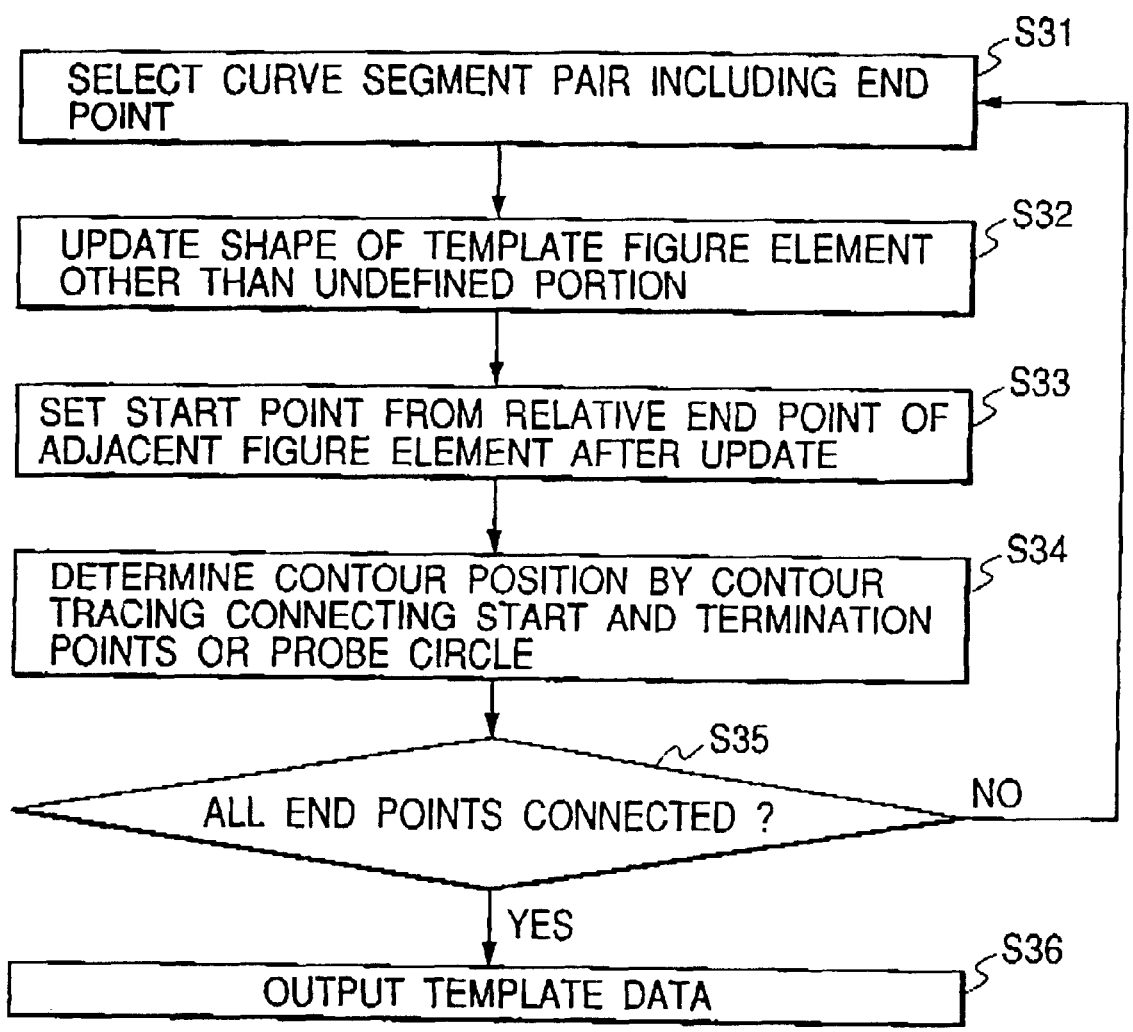
FIG. 14 is a flow chart of template update processing in the third embodiment.

FIG. 14 shows a flow chart of template update processing in the third embodiment. Processing shown in FIG. 14 corresponds to S7 of FIG. 5.

First, a curve segment pair including end points is selected (S31), and the shape of the template figure element other than the undefined portion is updated by the method described in the prior embodiment (S32). Next, the start point and the termination point are set from the relative end points of the adjacent figure element after update (S33), and the above-described method, that is, contour tracing (the first method) interconnecting the start and termination points, or contour position determination (the second method) with a probe circle is executed (S34). The above processing is repeated until all end points are gone (S35), and when one closed curved line is formed by the figure element of the template (S35), it is output as template date after update (S36).

In such a construction, the contour of an extraction target in which it is known in advance that uncertainty (degree of freedom) of shape as to the undefined portion is high, can be stably extracted. That is, even if a target having a portion greatly different from the shape of the given template. is present in the image, it can be obtained as the most likelihood curved line so as to complement the gap of the remaining determined partial shape as to the contour of the different portion (e.g., a curved line obtained by contour tracing as one satisfying conditions of shape continuity at the end point or continuity of the image feature quantity).

Figure 15:
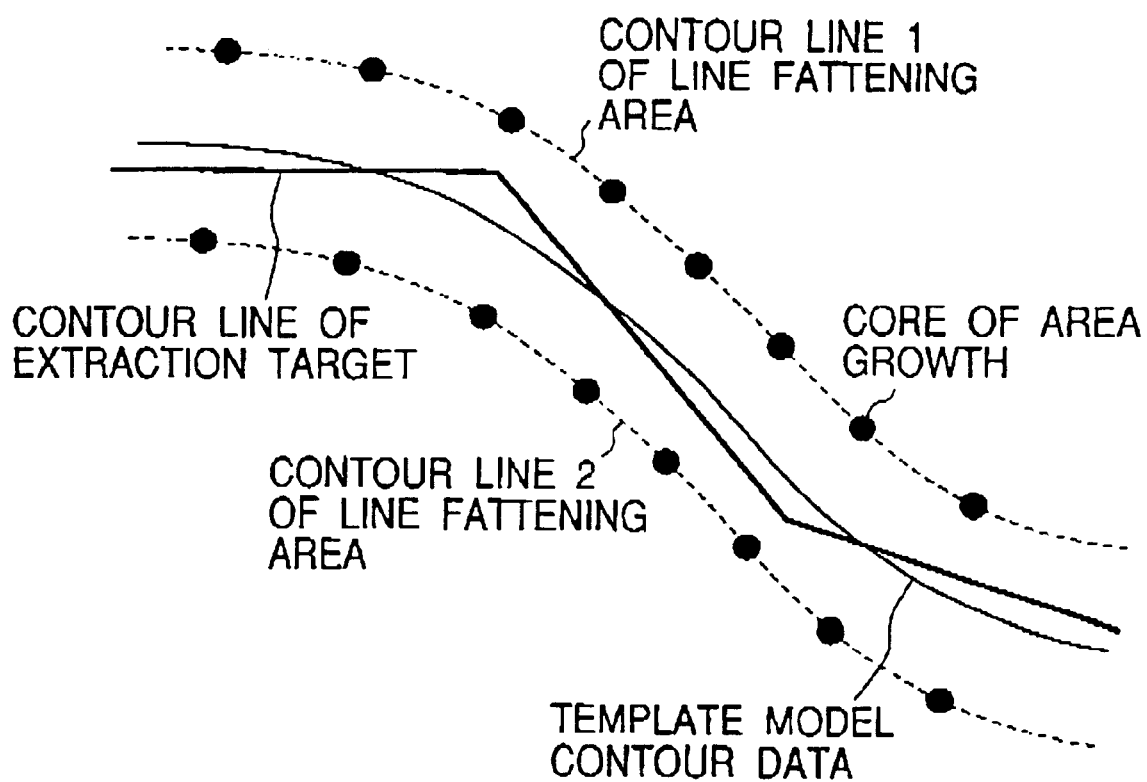
FIG. 15 is a description example of FIG. 14.

As the fourth embodiment, as processing corresponding to template update processing (S7 of FIG. 5), a fat line of a predetermined width along the curved line (or segment) of the figure element constituting the template passing between the representative points (or with the curved line being its center line) may be generated as shown in FIG. 15, and the boundary position within the fat line may be presumed on the basis of the feature quantity (such as color component value and local spatial frequency representative value) on both sides of the fat line. In this case, before template update processing, the same processing as the prior embodiment is performed.

Concretely, on at least one of the contour line 1 or the contour line 2 in the fattened area as shown in FIG. 15, a core for area growth is set. In area growth processing, a near area of the core in which the difference of image feature quantity in the core is smaller than a predetermined threshold value, is annexed to the core, and the growth result from the contour line 1 and the growth result from the contour line 2 obtained as the result, are integrated. Or, one boundary line is presumed on the basis of the growth result from either contour line.

The boundary position is determined, e.g., as the maximum edge intensity position of the feature quantity on a line substantially perpendicular to a direction of the fat line, as a boundary position by area growth based on similarity of the feature quantity (e.g., color component) from predetermined sampling points on both sides of the fat line, or the like.

In this embodiment, the contour line finally extracted may not always be represented by a parametric curve.

As easily understood from the above description, according to the present invention, by executing scan of template data and fit evaluation in relation to the shape, and deformation with giving constraint conditions (such as shift range, shape constraint condition, and local geometric conversion), a target fitting to information given in advance in relation to the shape, can automatically be searched from the image. Besides, permeability of deformation is high in the fitted range, and contour extraction and image extraction strong to noise becomes possible.

In deformation of the template, since a set of constraint conditions on the whole in relation to deformation (shift of representative points) is given, or presumption of local geometric conversion so as to keep geometric topology, is performed, shape information in a wide area is always kept, and it is hard to receive affection of local noise or the like. Accordingly, even if the background has a complex pattern, extraction of an unnatural contour is effectively prevented.

What is claimed is:

1. An image processing method comprising:

an image input step of inputting an image;

a feature quantity extraction step of extracting a feature quantity distribution of the input image by said image input step;

a template model input step of inputting a template model including a plurality of representative points and curved lines or segments interconnecting said representative points as a figure element;

a matching step of performing matching processing between said template model and said feature quantity distribution;

a shift condition set step of setting a shift condition of said each representative point on the basis of a matching result of said matching step;

a representative point update step of shifting said each representative point in accordance with said shift condition;

a template update step of generating an update template including the representative points after shift and curved lines or segments interconnecting said representative points as a figure element; and an image extraction step of extracting image data in an area within said update template from said input image.

2. A method according to claim 1, wherein a shift range of said representative point is set in advance on the basis of the positions of the other representative points.

3. A method according to claim 1, wherein the curved line interconnecting said representative points is represented by a predetermined spline function passing said each representative point.

4. A method according to claim 1, wherein a second matching processing is performed after generation of said update template, and a representative point is added or eliminated on the basis of an evaluation function value of said second matching processing after generation of said update template.

5. A method according to claim 4, wherein the evaluation function of said second matching processing is a distribution function of edge points on said figure element, and said representative point is added to a predetermined position of a section where non-edge points are present continuously in a certain length or more.

6. A method according to claim 1, wherein said template model input step includes a step of selecting a base template belonging to an extraction category.

7. A method according to claim 1, wherein said template update step comprises a deformation mode that is a geometric conversion including at least one of perspective transformation and affine transformation in relation to the whole or part of said figure element.

8. A method according to claim 1, wherein said figure element is the contour line of a target to be extracted.

9. A method according to claim 1, wherein said figure element is an image obtained by thinning the image of a target to be extracted, at a predetermined degree of resolution.

10. A method according to claim 1, wherein said figure element is an image obtained by thinning the contour image of a target to be extracted, at a predetermined degree of resolution.

11. A method according to claim 1, wherein said figure element is represented by a parameter of a predetermined spline curve.

12. A method according to claim 1, wherein said figure element is represented by a parameter of a predetermined Fourier descriptor or wavelet descriptor.

13. A method according to claim 12, wherein said figure element is represented by a parameter of a predetermined order Fourier descriptor or wavelet descriptor.

14. A method according to claim 1, wherein a shift range of said representative point is larger in case that said evaluation function value is not less than a predetermined threshold value when the representative point on said figure element is a non-edge point in relation to said feature quantity, than that when said representative point is an edge point in relation to said feature quantity.

15. A method according to claim 1, wherein a shift range is set such that a sign of a second order differential value at said representative point of a contour line obtained at a predetermined degree of resolution of said figure element after shift of each representative point, is kept.

16. A method according to claim 1, wherein, in said update step, said figure element of said template model has at least one open end, and, by said open end position shifting after generation of said update template or in said update step on the basis of said feature quantity distribution, a shape of said figure element is updated.

17. A method according to claim 1, wherein a shift position of said representative point is determined such that an edge rate on the curved line or segment interconnecting said representative points after shift becomes a maximum or not less than a predetermined reference value.

18. A method according to claim 1, wherein a shift position of said representative point and the number of said representative points are determined such that a predetermined information quantity reference value of the template model after said update to said feature quantity distribution becomes a maximum.

19. A method according to claim 1, wherein said feature quantity is a representative value of a local spatial frequency component.

20. A method according to claim 1, wherein said representative point update step comprises a step of obtaining a maximum likelihood presumption value of a predetermined local geometric conversion parameter to said template data most fitting to the distribution of said feature quantity.

21. A method according to claim 20, wherein said maximum likelihood presumption value is obtained as said geometric conversion parameter value that a predetermined evaluation function comprising a first evaluation function term comprising a predetermined linear sum of a prior probability distribution corresponding to a plurality of geometric conversion modes and a second evaluation function term giving a posterior probability of said geometric conversion modes to said feature quantity, is made a maximum.

22. An image processing method comprising:
   a step of inputting an image;
   a feature quantity extraction step of extracting a feature quantity distribution of the input image by said image input step;
   a template model input step of inputting a template model including a plurality of representative points and curved lines or segments interconnecting said representative points as a figure element;
   a template set generation step of generating a plurality of template sets different in size from each other, having figure elements generally similar to the figure element of said template model from said template model;
   a first matching step of performing the first matching processing between said template sets and the feature quantity distribution of said input image;
   a template selection step of selecting one of said template sets on the basis of a result of said first matching step;
   a second matching step of performing the second matching processing to said feature quantity distribution as to each representative point of the template selected in said template selection step; a representative point update step of shifting said representative point on the basis of a result of said second matching step;
   a template update step of generating an update template including the representative points after shift and curved lines or segments interconnecting said representative points as a figure element;
   a mask area generation step of generating a mask area including said figure element in said update template as a boundary line; and
   an image extraction step of extracting one of the contour line of said mask area and image data corresponding to said mask area.

23. A method according to claim 22, wherein said representative point is that a shift range is set in advance.

24. A method according to claim 22, wherein a shift range of said representative point is set in advance on the basis of the positions of the other representative points.

25. A method according to claim 22, wherein said first matching processing is to obtain a predetermined evaluation function value in relation to at least one of a first coincidence degree in relation to the value of said feature quantity of said input image and said template and a second coincidence degree in relation to an inclination of the feature quantity.

26. A method according to claim 25, wherein an inclination of said feature quantity is an inclination of a segment or curved line constituting said figure element at a predetermined point on said figure element, and a second feature quantity represents the coincidence degree of said inclination.

27. A method according to claim 25, wherein said evaluation function is a total in relation to distance of an edge rate on said figure element or a feature quantity inclination at each point on said figure element and an edge intensity inclination at the point corresponding to said each point on said edge data.

28. A method according to claim 22, wherein said first matching processing is to obtain a predetermined evaluation function value in relation to at least one of a first coincidence degree in relation to the value of said feature quantity of said input image and said template and a second coincidence degree in relation to an inclination of the feature quantity as to each representative point on the figure element of said template and points along the curved line interconnecting them.

29. A method according to claim 28, wherein an inclination of said feature quantity is an inclination of a segment or curved line constituting said figure element at a predetermined point on said figure element, and a second feature quantity represents the coincidence degree of said inclination.

30. A method according to claim 28, wherein said evaluation function is a total in relation to distance of an edge rate on said figure element or a feature quantity inclination at each point on said figure element and an edge intensity inclination at the point corresponding to said each point on said edge data.

31. A method according to claim 29, wherein said second matching processing is executed when an evaluation function value of said first matching processing becomes not less than a predetermined threshold value, and said first matching processing is to obtain said evaluation function value by shifting a centroid position of said template, and setting a shift range of said each representative point such that a relative position to another representative point position is generally kept.

32. A method according to claim 22, wherein the curved line interconnecting said representative points is represented by a predetermined spline function passing said each representative point.

33. A method according to claim 22, wherein said figure element is the contour line of a target to be extracted.

34. A method according to claim 22, wherein said figure element is an image obtained by thinning the image of a target to be extracted, at a predetermined degree of resolution.

35. A method according to claim 22, wherein said figure element is an image obtained by thinning the contour image of a target to be extracted, at a predetermined degree of resolution.

36. A method according to claim 22, wherein said figure element is represented by a parameter of a predetermined spline curve.

37. A method according to claim 22, wherein said figure element is represented by a parameter of a predetermined Fourier descriptor or wavelet descriptor.

38. A method according to claim 37, wherein said figure element is represented by a parameter of a predetermined order Fourier descriptor or wavelet descriptor.

39. A method according to claim 22, wherein a shift range of said representative point is larger in case that said evaluation function value is not less than a predetermined threshold value when the representative point on said figure element is a non-edge point in relation to said feature quantity, than that when said representative point is an edge point in relation to said feature quantity.

40. A method according to claim 22, wherein a shift range is set such that a sign of a second order differential value at said representative point: of a contour line obtained at a predetermined degree of resolution of said figure element after shift of each representative point, is kept.

41. A method according to claim 22, wherein, in said update step, said figure element of said template model has at least one open end, and, by said open end position shifting after generation of said update template or in the generation process on the basis of said feature quantity distribution, the shape of said figure element is updated.

42. A method according to claim 22, wherein a shift position of said representative point is determined such that an edge rate on the curved line or segment interconnecting said representative points after shift becomes a maximum or not less than a predetermined reference value.

43. A method according to claim 22, wherein a shift position of said representative point and a number of said representative points are determined such that a predetermined information quantity reference value of the template model after said update to said feature quantity distribution becomes a maximum.

44. A method according to claim 22, wherein said feature quantity is a representative value of a local spatial frequency component.

45. A method according to claim 22, wherein said representative point update step comprises a step of obtaining a maximum likelihood presumption value of a predetermined local geometric conversion parameter to said template data most fitting to the distribution of said feature quantity.

46. A method according to claim 45, wherein said maximum likelihood presumption value is obtained as said geometric conversion parameter value that a predetermined evaluation function comprising a first evaluation function term comprising a predetermined linear sum of a prior probability distribution corresponding to a plurality of geometric conversion modes and a second evaluation function term giving a posterior probability of said geometric conversion modes to said feature quantity, is made a maximum.

47. An image processing apparatus comprising:
  image input means for inputting an image;
  feature quantity extraction means for extracting a feature quantity distribution of the input image by said image input means;
  template model input means for inputting a template model including a plurality of representative points and curved lines or segments interconnecting said representative points as a figure element;
  matching means for performing matching processing between said template model and said feature quantity distribution;
  shift condition set means for setting a shift condition of said each representative point on the basis of a matching result of said matching means;
  representative point update means for shifting said each representative point in accordance with said shift condition;
  template update means for generating an update template including the representative points after shift and curved lines or segments interconnecting said representative points as a figure element; and image extraction means for extracting image data in an area within said update template from said input image.

48. An image processing apparatus comprising:

means for inputting an image;

feature quantity extraction means for extracting a feature quantity distribution of the input image by said image input means;

template model input means for inputting a template model including a plurality of representative points and curved lines or segments interconnecting said representative points as a figure element;

template set generation means for generating a plurality of template sets different in size from each other, having figure elements generally similar to the figure element of said template model from said template model;

first matching means for performing the first matching processing between said template sets and the feature quantity distribution of said input image;

template selection means for selecting one of said template sets on the basis of a result of said first matching means;

second matching means for performing the second matching processing to said feature quantity distribution as to each representative point of the template selected in said template selection means;

representative point update means for shifting said representative point on the basis of a result of said second matching means;

template update means for generating an update template including the representative points after shift and curved lines or segments interconnecting said representative points as a figure element;

mask area generation means for generating a mask area including said figure element in said update template as a boundary line; and image extraction means for extracting one of the contour line of said mask area and image data corresponding to said mask area.

49. A storage medium storing an image processing method comprising:

an image input step of inputting an image;

a feature quantity extraction step of extracting a feature quantity distribution of the input image by said image input step;

a template model input step of inputting a template model including a plurality of representative points and curved lines or segments interconnecting said representative points as a figure element;

a matching step of performing matching processing between said template model and said feature quantity distribution;

a shift condition set step of setting a shift condition of said each representative point on the basis of a matching result of said matching step;

a representative point update step of shifting said each representative point in accordance with said shift condition;

a template update step of generating an update template including the representative points after shift and curved lines or segments interconnecting solid representative points as a figure element; and an image extraction step of extracting image data in an area within said update template from said input image.

50. A storage medium storing an image processing method comprising:

a step of inputting an image;

a feature quantity extraction step of extracting a feature quantity distribution of the input image by said image input step;

a template model input step of inputting a template model including a plurality of representative points and curved lines or segments interconnecting said representative points as a figure element;

a template set generation step of generating a plurality of template sets different in size from each other, having figure elements generally similar to the figure element of said template model from said template model;

a first matching step of performing the first matching processing between said template sets and the feature quantity distribution of said input image;

a template selection step of selecting one of said template sets on the basis of a result of said first matching step;

a second matching step of performing the second matching processing to said feature quantity distribution as to each representative point of the template selected in said template selection step;

a representative point update step of shifting said representative point on the basis of a result of said second matching step;

a template update step of generating an update template including the representative points after shift and curved lines or segments interconnecting said representative points as a figure element;

a mask area generation step of generating a mask area including said figure element in said update template as a boundary line; and an image extraction step of extracting one of the contour line of said mask area and image data corresponding to said mask area.

* * * * *

UNITED STATES PATENT AND TRADEMARK OFFICE
CERTIFICATE OF CORRECTION

PATENT NO. : 6,650,778 B1
DATED : November 18, 2003
INVENTOR(S) : Matsugu et al.

It is certified that error appears in the above-identified patent and that said Letters Patent is hereby corrected as shown below:

Column 1,
Line 46, "date" should read -- data --.

Column 4,
Line 55, "date" should read -- data --.

Column 6,
Line 11, and Φ" should read -- and φ --.

Column 7,
Line 30, "change" should read -- changes --.

Column 11,
Line 12, "AlC(Q)" should read -- AlC (Q) --; and

Line 14, "$\sum_{l=1}^{N}$" should read -- $\sum_{i=1}^{N}$ --.

Column 13,
Line 29, "argmax" should read -- arg max -- (both occurrences); and
Line 56, "Including" should read -- including --.

Column 14,
Line 60, "them" should read -- those --.

Column 15,
Line 54, "template." should read -- template --.

Column 19,
Line 36, "claim 29," should read -- claim 22, --.

UNITED STATES PATENT AND TRADEMARK OFFICE
CERTIFICATE OF CORRECTION

PATENT NO. : 6,650,778 B1
DATED : November 18, 2003
INVENTOR(S) : Matsugu et al.

It is certified that error appears in the above-identified patent and that said Letters Patent is hereby corrected as shown below:

Column 22,
Line 49, "and an" should read -- and ¶ an --.

Signed and Sealed this

Twenty-fourth Day of August, 2004

JON W. DUDAS
*Director of the United States Patent and Trademark Office*